US00RE44072E

(19) United States
(12) Reissued Patent
Milan

(10) Patent Number: US RE44,072 E
(45) **Date of Reissued Patent: *Mar. 12, 2013**

(54) SELECTIVE FLASH MEMORY DRIVE WITH QUICK CONNECTOR

(76) Inventor: Henry Milan, Rochester, MI (US)

( * ) Notice: This patent is subject to a terminal disclaimer.

(21) Appl. No.: 12/829,098

(22) Filed: Jul. 1, 2010

Related U.S. Patent Documents

Reissue of:
(64) Patent No.: 7,393,224
Issued: Jul. 1, 2008
Appl. No.: 11/424,599
Filed: Jun. 16, 2006

U.S. Applications:
(63) Continuation-in-part of application No. 10/965,641, filed on Oct. 14, 2004, now Pat. No. 7,419,393, which is a continuation-in-part of application No. 10/328,519, filed on Dec. 23, 2002, now Pat. No. 7,004,787.

(Continued)

(51) Int. Cl.
*H01R 29/00* (2006.01)
(52) U.S. Cl. ..... 439/171
(58) Field of Classification Search ..... 439/502, 439/35, 503, 433–434, 218, 540, 851, 850, 439/842, 845, 849, 217, 222, 638, 171, 120, 439/578–585, 675
See application file for complete search history.

(56) References Cited

U.S. PATENT DOCUMENTS

| | | | |
|---|---|---|---|
| 2,776,415 | A | 1/1957 | McGinley |
| 3,885,849 | A | 5/1975 | Bailey et al. |
| 4,057,310 | A | 11/1977 | Young |
| 4,310,213 | A | 1/1982 | Fetterolf, Sr. et al. |
| D295,971 | S | 5/1988 | Kikuta |
| 4,824,383 | A | 4/1989 | Lemke |
| D301,870 | S | 6/1989 | Shibano |
| 4,846,697 | A | 7/1989 | Rodgers |
| 5,119,020 | A | 6/1992 | Massey et al. |
| 5,197,900 | A | 3/1993 | Ellis et al. |
| 5,236,373 | A | 8/1993 | Kennedy |
| 5,293,013 | A | 3/1994 | Takahashi |
| 5,315,062 | A | 5/1994 | Hoshino |
| 5,370,550 | A | 12/1994 | Alwine et al. |
| 5,425,653 | A | 6/1995 | Koiso |
| 5,445,534 | A | 8/1995 | Ishizuka et al. |
| 5,609,501 | A | 3/1997 | McMills et al. |

(Continued)

FOREIGN PATENT DOCUMENTS

| | | |
|---|---|---|
| DE | 100 31 954 | 3/2001 |
| EP | 1 096 760 | 5/2001 |

(Continued)

*Primary Examiner* — Edwin A. Leon
(74) *Attorney, Agent, or Firm* — Bill C. Panagos; Linda D. Kennedy; Butzel Long

(57) ABSTRACT

A flash memory device includes a flash memory drive with a quick connector in a housing. The quick connector is adapted to engage a cooperating quick connector of a selected one of a plurality of different interchangeable connectors. The interchangeable connectors each have standard connector for connection with computers and other devices that are compatible with the flash memory. A universal computer cable kit includes a universal cable having quick connectors on opposing ends thereof, a plurality of the interchangeable connectors, the flash memory device, a container for storing the interchangeable connectors and the flash memory device, and a blister pack for packaging and displaying the kit. The flash memory device can function as a host and has a control and display for selective transfer of files.

25 Claims, 12 Drawing Sheets

Related U.S. Application Data

(60) Provisional application No. 60/387,796, filed on Jun. 11, 2002, provisional application No. 60/401,900, filed on Aug. 8, 2002.

(56) References Cited

U.S. PATENT DOCUMENTS

| | | | | |
|---|---|---|---|---|
| 5,637,009 | A | 6/1997 | Tsuji et al. | |
| 5,658,170 | A | 8/1997 | Tan et al. | |
| 5,692,918 | A | 12/1997 | Hill | |
| 5,772,453 | A | 6/1998 | Tan et al. | |
| 5,772,472 | A | 6/1998 | Beutler et al. | |
| 5,823,814 | A | 10/1998 | Alwine | |
| D405,053 | S | 2/1999 | Tan et al. | |
| 5,954,523 | A | 9/1999 | Babcock | |
| 5,961,351 | A | 10/1999 | Wu | |
| 5,975,954 | A | 11/1999 | Wu et al. | |
| 6,007,380 | A | 12/1999 | Shimojyo | |
| 6,007,382 | A | 12/1999 | Wu | |
| 6,010,348 | A | 1/2000 | Alden | |
| 6,080,012 | A | 6/2000 | Zhu et al. | |
| 6,089,879 | A | 7/2000 | Babcock | |
| 6,155,872 | A | 12/2000 | Wu | |
| 6,171,136 | B1 | 1/2001 | Liu et al. | |
| 6,183,292 | B1 | 2/2001 | Chen et al. | |
| 6,210,231 | B1 | 4/2001 | Lai | |
| 6,215,656 | B1 | 4/2001 | O'Neal et al. | |
| 6,217,378 | B1 | 4/2001 | Wu | |
| 6,220,872 | B1 | 4/2001 | Chen | |
| D443,251 | S | 6/2001 | Wang et al. | |
| 6,250,955 | B1 | 6/2001 | Archuleta | |
| 6,257,930 | B1 | 7/2001 | Yu | |
| 6,280,243 | B1 * | 8/2001 | Liu et al. | 439/502 |
| 6,302,721 | B1 | 10/2001 | Turner et al. | |
| 6,309,255 | B1 | 10/2001 | Yu | |
| 6,334,793 | B1 | 1/2002 | Amoni et al. | |
| 6,346,002 | B1 | 2/2002 | Hsu et al. | |
| 6,358,088 | B1 | 3/2002 | Nishio et al. | |
| 6,406,313 | B1 * | 6/2002 | Victor | 439/175 |
| 6,466,437 | B1 | 10/2002 | Sakuragi et al. | |
| 6,637,909 | B1 | 10/2003 | Bryan | |
| 6,663,420 | B1 | 12/2003 | Xiao | |
| 6,728,108 | B2 | 4/2004 | Chen | |
| 6,733,329 | B2 * | 5/2004 | Yang | 439/518 |
| 6,908,324 | B1 | 6/2005 | Morley et al. | |
| 7,780,463 | B2 * | 8/2010 | Milan | 439/171 |

FOREIGN PATENT DOCUMENTS

| | | |
|---|---|---|
| EP | 1 100 158 | 5/2001 |
| GB | 2 332 103 | 6/1999 |
| JP | P2001-209460 | 3/2001 |

* cited by examiner

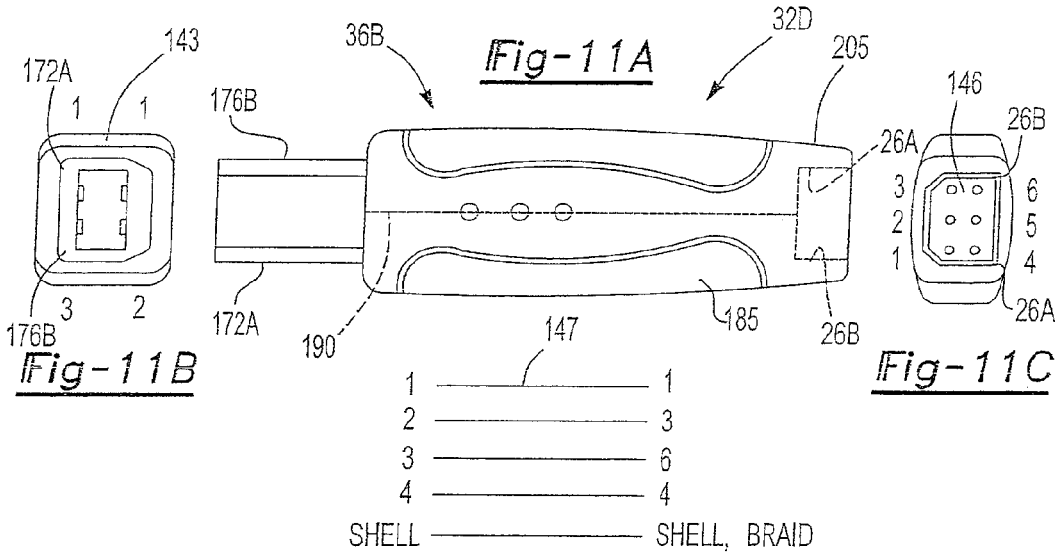
Fig-11A
Fig-11B
Fig-11C
Fig-11D
32D
36B
143
172A
176B
205
146
26B
26A
185
190
147
SHELL
SHELL, BRAID
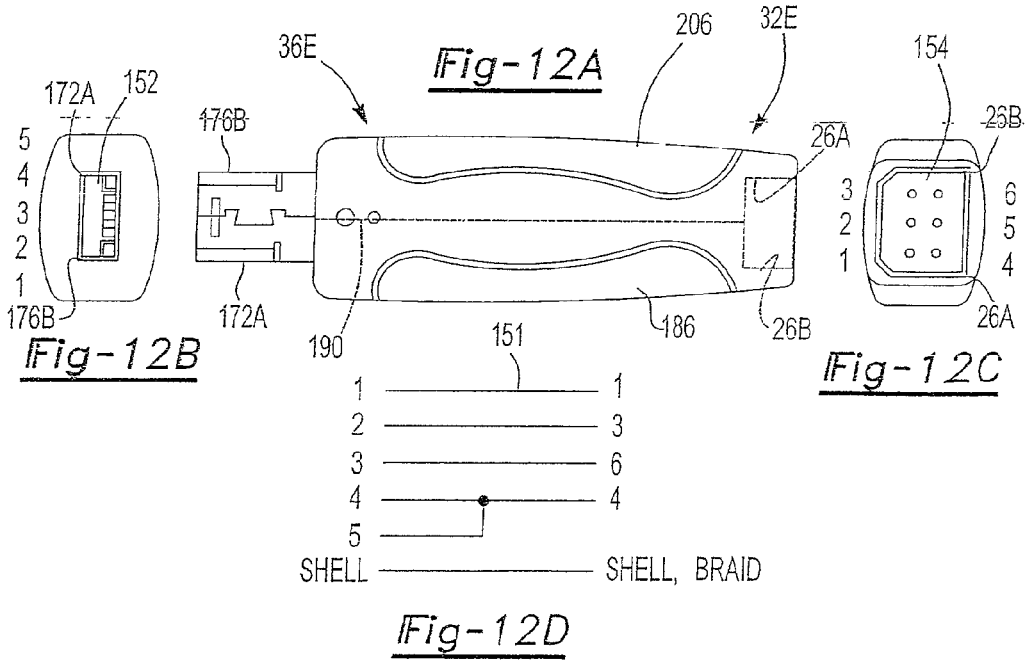
Fig-12A
Fig-12B
Fig-12C
Fig-12D
36E
206
32E
154
172A
152
176B
26A
26B
186
190
151
SHELL
SHELL, BRAID

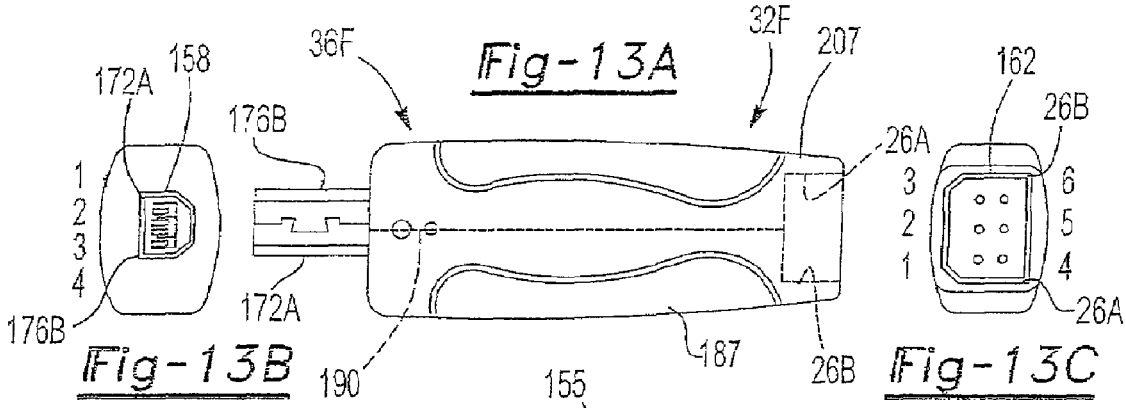
Fig-13A
Fig-13B
Fig-13C
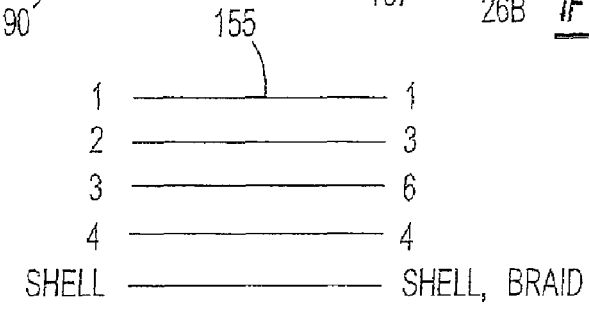
Fig-13D

SELECTIVE FLASH MEMORY DRIVE WITH QUICK CONNECTOR

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of co-pending U.S. patent application Ser. No. 10/965,641 filed Oct. 14, 2004, which is a continuation-in-part of U.S. patent application Ser. No. 10/328,519 filed Dec. 23, 2002, now U.S. Pat. No. 7,004,787 issued Feb. 28, 2006, which claims the benefit of U.S. Provisional Patent Application Ser. No. 60/387,796, filed Jun. 11, 2002, and the benefit of U.S. Provisional Patent Application Ser. No. 60/401,900, filed Aug. 8, 2002.

BACKGROUND OF THE INVENTION

The present invention relates to computers, computer peripherals, computer related devices, and other devices that may benefit from a quick and efficient method and/or system for connection to other like or different devices. More particularly, the present invention relates to a system and method for connecting computers and/or computer peripherals to other computers and/or computer peripherals using a universal computer cable having quick connectors and interchangeable ends, and a universal cabling system and method of using the connectors to connect computers, computer peripherals, computer related devices and other devices together. One such computer peripheral is a flash memory storage device.

The fields of computers, computer peripherals, and computer related devices are rapidly expanding. All of these devices must be connected to one another to communicate. This has caused a problem in the art due to the large number of conventional connector types and cable lengths, which are currently used. Many of these devices currently use universal serial bus (USB) or Firewire® computer architecture.

The USB architecture uses a four wire cable, or whatever the current USB specification calls for, usually in six, ten, or fifteen foot lengths, having seven different configurations possible on one end of the cable, and three different configurations possible on the other end of the cable, making possible many different configurations in each of the three popular lengths. Current USB Standards do not permit a cable length greater than fifteen feet without a repeater.

Five different types of plugs (male) or receptacles (female) are used on the ends of the USB cables to form these configurations. These are a USB A Male, USB B Male, MiniUSB A Male and MiniUSB B Male plugs, as well as a USB A Female receptacle. Any one of these plugs or receptacles may be found on either end of a USB cable. The only limitation on the possible combinations is that an A Male USB plug is not used with a MiniUSB A Male plug, and a MiniUSB B Male plug is not used with a USB B Male plug.

Firewire® computer architecture uses a four or six wire cable, or whatever the current Firewire® specification calls for, usually in the same lengths as a USB cable, and having a six pin Firewire® computer connector on one or both ends of a Firewire® cable, and a four pin audio-visual connector, which also may be on one, or both, ends of a Firewire® cable, thus providing additional cable configurations.

The large number of cable configurations causes problems in the art for the computer and/or peripheral, or device manufacturer, the wholesaler, the retailer, and the user, all of whom are put to the expense of manufacturing and/or stocking and/or selling and/or buying and/or using a bewildering array of cables to connect computers and/or computer peripherals to other computers and/or computer peripherals or devices. Thus, those skilled in the art have begun to search for an easier and less costly way to accomplish these connections.

Flash memory is well known and is utilized in various portable storage devices for transferring and storing computer files and programs. A typical flash memory device has a housing including an integral connector for connecting to a USB port on a computer. When plugged into a USB port, the computer's operating system recognizes the flash memory device as a removable drive and allows data to be retrieved from and written to the flash memory drive.

It is desirable to provide a flash memory drive that can accommodate a variety of interface connections and/or configurations to enable transfer of files from the flash memory drive to a variety of external devices.

SUMMARY OF THE INVENTION

The present invention concerns a flash memory device including a housing having opposed first and second ends; a flash memory drive enclosed in the housing; and a quick connector mounted in the housing and having a plurality of pins exposed at the second end, the pins being configured for connection to a selected one of at least two different interchangeable connectors. The flash memory device housing can include a loop portion extending from the first end.

The plurality of pins can be six female pins arranged in two parallel rows of three pins each and including a female connector body extending about said pins. The flash memory drive is electrically connected to the pins. Also provided are at least two interchangeable connectors each having a male quick connector electrically connected to a conventional connector and adapted to engage said female quick connector on the flash memory device. The conventional connectors can be, for example, a 4-Pin USB Series "A" Receptacle, a 4 Pin USB Series "A" Plug, a 4-Pin USB Series "B" Plug, a 5-Pin USB 2.0 Specification Mini-"A" Plug, and a 4-Pin USB 2.0 Specification Mini-"B" Plug. By selecting the appropriate interchangeable connector, the flash memory device can be connected a computer or other device having a conventional connector port such as a USB port.

The flash memory can be part of a kit including a container for storing the interchangeable connectors and the flash memory device when not in use. The kit can also include a universal computer cable useable for USB or Firewire® computer architecture, and having the quick connectors for the use with the interchangeable connectors. The items in the kit can be packaged in a blister pack for display.

DESCRIPTION OF THE DRAWINGS

The above, as well as other advantages of the present invention will become readily apparent to those skilled in the art from the following detailed description of a preferred embodiment when considered in the light of the accompanying drawings in which:

FIG. 9A is an elevation view of a second modification of the construction shown in FIG. 7A;

FIG. 9B is a left side view of the construction of FIG. 9A;

FIG. 9C is a right side view of the construction of FIG. 9A;

FIG. 10A is an elevation view of a third modification of the construction shown in FIG. 7A;

FIG. 10B is a left side view of the construction of FIG. 10A;

FIG. 10C is a right side view of the construction of FIG. 10A;

FIG. 11A is an elevation view of a forth modification of the construction shown in FIG. 7A;

FIG. 11B is a left side view of the construction of FIG. 11A;

FIG. 11C is a right side view of the construction of FIG. 11A;

FIG. 11D is a pin-out diagram of the construction of FIG. 11A;

FIG. 12A is an elevation view of a fifth modification of the construction shown in FIG. 7A;

FIG. 12B is a left side view of the construction of FIG. 12A;

FIG. 12C is a right side view of the construction of FIG. 12A;

FIG. 12D is a pin-out diagram of the construction of FIG. 12A;

FIG. 13A is an elevation view of a sixth modification of the construction shown in FIG. 7A;

FIG. 13B is a left side view of the construction of FIG. 13A;

FIG. 13C is a right side view of the construction of FIG. 13A;

FIG. 13D is a pin-out diagram of the construction of FIG. 13A;

DETAILED DESCRIPTION OF THE PREFERRED EMBODIMENTS

Figure 1:
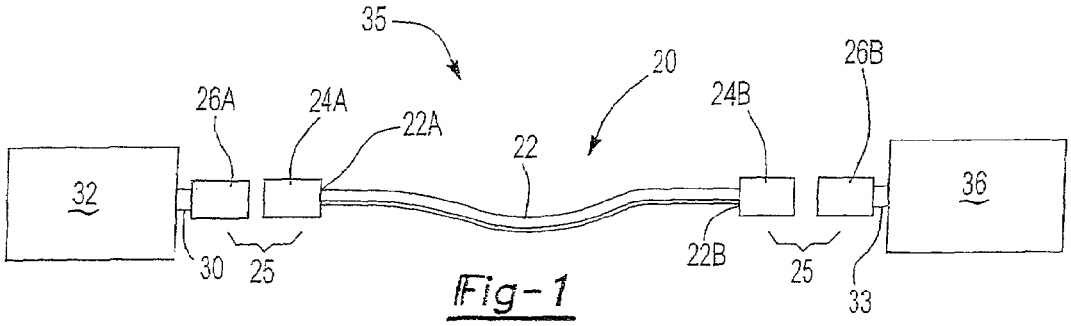
FIG. 1 is a diagrammatic view of a construction embodying the present invention.

Referring to FIG. 1, there is illustrated a diagrammatic view of a universal cable system, generally indicated by the numeral 35, which generally includes a universal cable 20 having a universal cable portion 22. The universal cable portion 22 comprises a predetermined length of a USB cable, Firewire® cable, or other suitable cable for the purpose intended. The universal cable portion 22 has a universal cable portion first end and a universal cable portion second end, 22A and 22B, respectively.

The universal cable portion first end 22A is mechanically and electrically attached to a universal cable first connector portion 24A and the universal cable portion second end 22B is mechanically and electrically attached to a universal cable second connector portion 24B, said portions 24A and 24B preferably are, but not necessarily, female. Hence the universal cable first connector portion 24A is in electrical communication with the universal cable second connector portion 24B. Thus, the combination of the universal cable portion 22, and the universal connector portions 24A and 24B define the basic universal cable 20. In the first preferred embodiment of the present invention, the universal cable first connector portion 24A is identical to universal cable second connector portion 24B.

Also shown in FIG. 1 are two universal cable connectors 25, which comprise a combination of the universal cable first connector portion 24A and a quick connect first mating connector portion 26A, or a combination of the universal cable second connector portion 24B and a quick connect second mating connector portion 26B. Thus, the universal cable 20 may be further defined as the combination of the universal cable portion 22 and the two universal cable connectors 25. If the universal cable 20 is mateably attached to first and second USB or Firewire® plugs, receptacles, or converters (32 and 36 respectively), then the universal cable 20 of the present invention may be referred to as a universal USB cable or a universal Firewire® cable, respectively, of the universal cable system 35.

Figure 2:
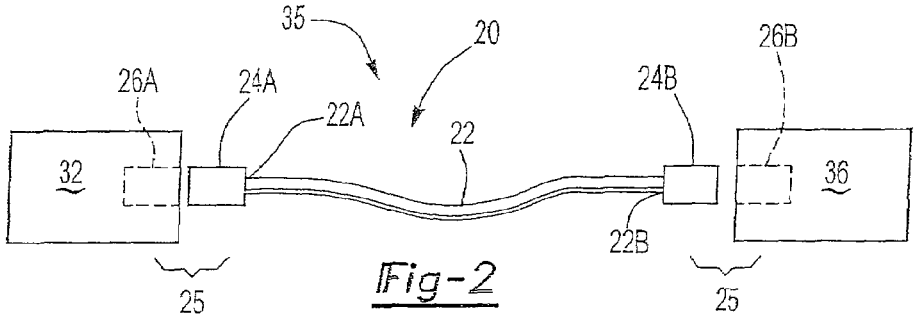
FIG. 2 is a diagrammatic view of a modification of the construction shown in FIG. 1.

Referring to FIG. 2, there is shown a modification of the present invention, which is in large part similar to that shown in FIG. 1, with an additional feature that the quick connect first mating (or male) connector portion 26A is formed integrally with the first serial bus plug, Firewire® plug, receptacle or converter 32. Similarly, the quick connect second mating (or male) connector portion 26B is formed integrally with the second USB plug, receptacle, Firewire® plug, or converter 36. Thus the quick connect first cable portion 30 and quick connect second cable portion 33 are eliminated, making the modification of the invention shown in FIG. 2 simpler and less costly to produce than the version shown in FIG. 1.

Figure 3:
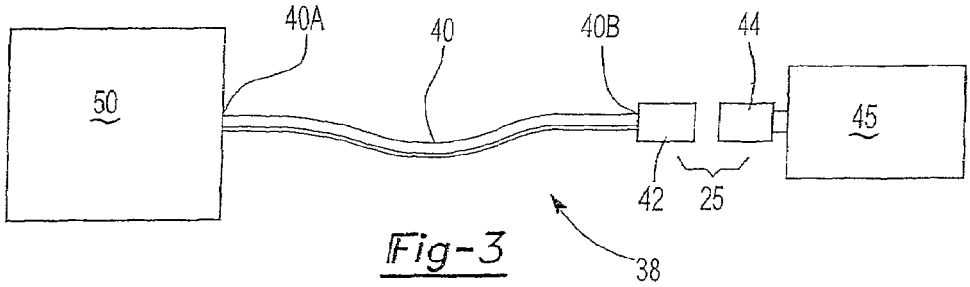
FIG. 3 is a diagrammatic view of a further modification of the present invention.

Referring to FIG. 3, a universal serial bus cabling system 38 may be provided, in accordance with the present invention, by providing a universal serial bus cable portion 40, or one of the other types of cables mentioned above. The universal serial bus cable having a universal serial bus cable first end 40A and a universal serial bus cable second end 40B with at least a universal first system connector 42 electrically connected to the universal serial bus cable second end 40B. Further provided is at least one quick connect system serial bus plug or receptacle or converter 45, which may be miniature in size, and having a quick connect system mating connector 44 that is capable of making mateable electrical and mechanical attachment to the universal first system connector 42. With the universal serial bus cable first end 40A of the universal serial bus cable 40 being electrically and mechanically connected to a computer, computer peripheral, computer related device, or other device 50, the present invention is thus capable of providing a universal serial bus cabling system 38 that possesses interchangeability of plugs, receptacles, Firewire® plugs, or converters for electrical communications between computer peripherals and/or computers or other electronic devices.

Figure 4:
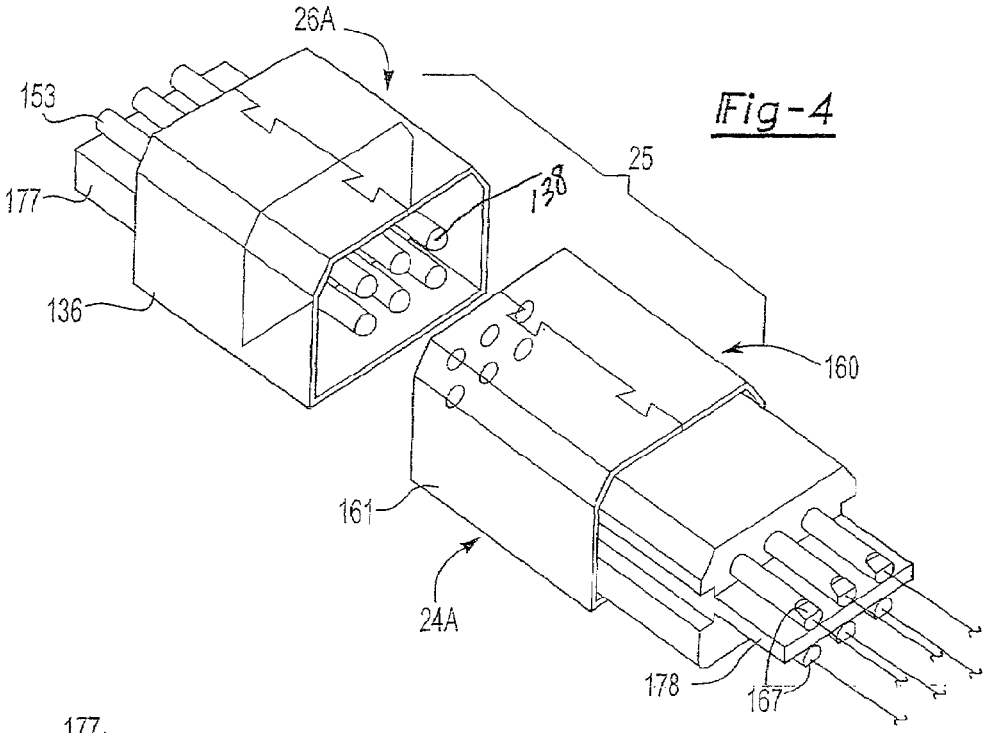
FIG. 4 is an exploded, perspective, view of a construction embodying the present invention.

Referring to FIG. 4, there is illustrated a universal cable connector 25 comprising the universal cable first (typically, female) connector portion 24A, and the universal cable quick connect first mating (typically, male) connector portion 26A. In the present invention a combination of the universal cable second (typically, female) connector portion 24B and the universal cable quick connect second mating (typically, male) connector portion 26B, and a combination of the universal first system connector 42 and the quick connect system mating connector 44 also form a universal cable connector 25.

Figure 6A:
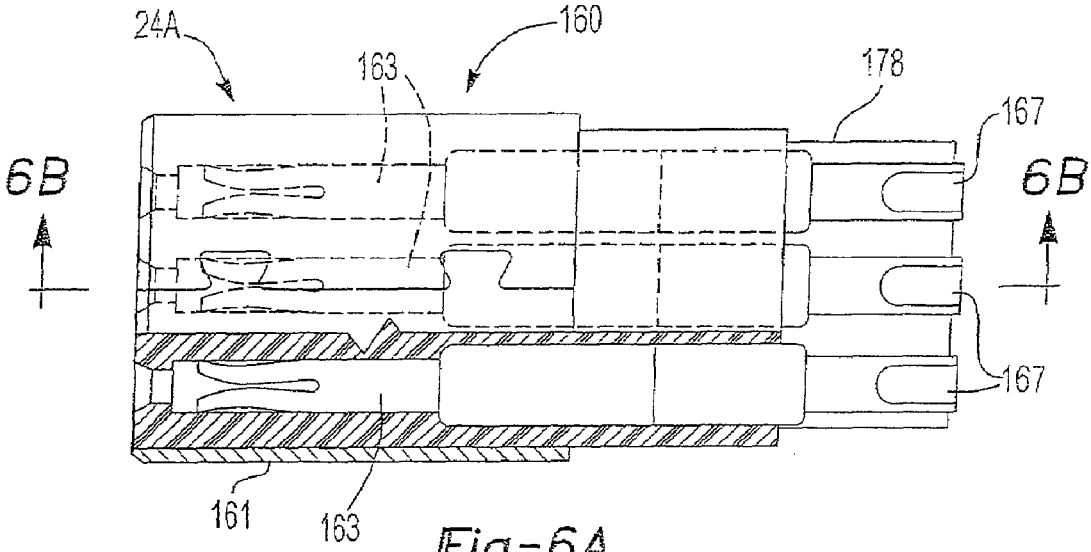
FIG. 6A is a top plan view, partially in section, of the female portion of the construction illustrated in FIG. 4.
Figure 6B:
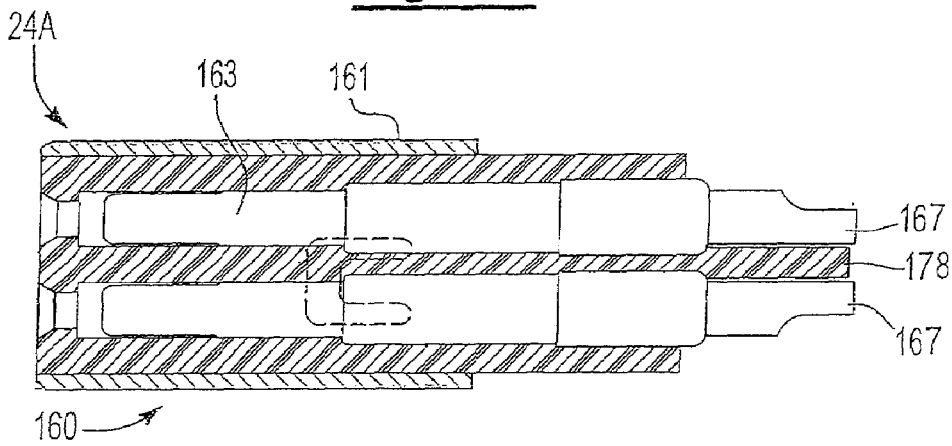
FIG. 6B is a sectional view, taken in the direction of the arrows, along the section line 6B-6B of FIG. 6A.
Figure 6C:
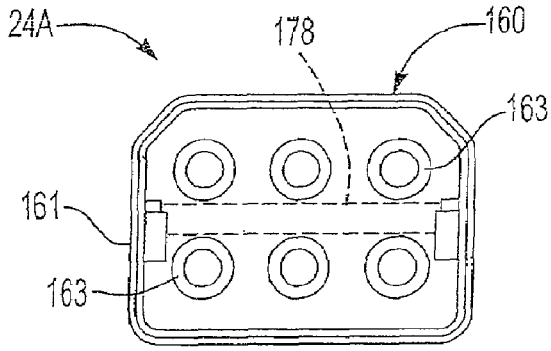
FIG. 6C is a left end view of the construction shown in FIG. 6B.
Figure 7B:
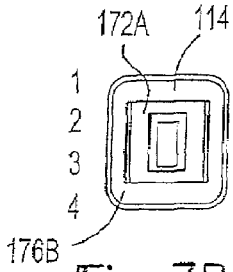
FIG. 7B is a left side view of the construction of FIG. 7A.
Figure 7A:
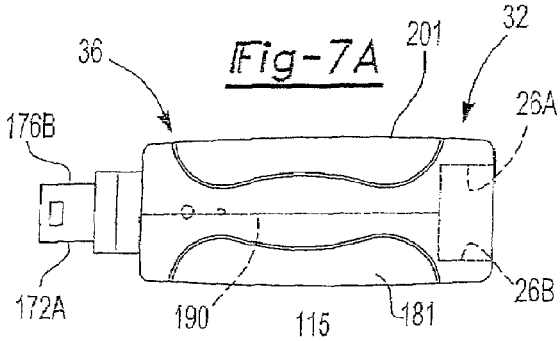
FIG. 7A is an elevation view of a plug, receptacle or converter embodying the construction shown in FIG. 5A.
Figure 7C:
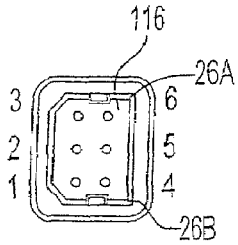
FIG. 7C is a right side view of the construction of FIG. 7A.
Figure 7D:
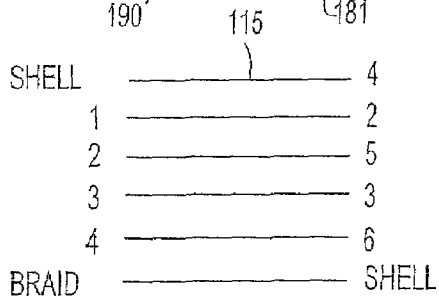
FIG. 7D is a pin-out diagram of the construction of FIG. 7A.
Figure 8B:
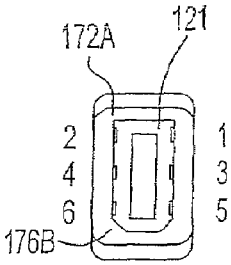
FIG. 8B is a left side view of the construction of FIG. 8A.
Figure 8A:
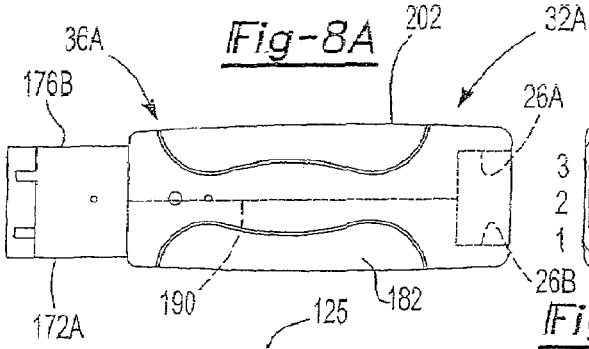
FIG. 8A is an elevation view of a first modification of the construction shown in FIG. 7A.
Figure 8C:
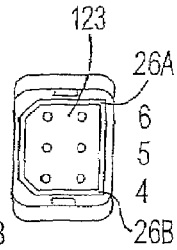
FIG. 8C is a right side view of the construction of FIG. 8A.
Figure 8D:
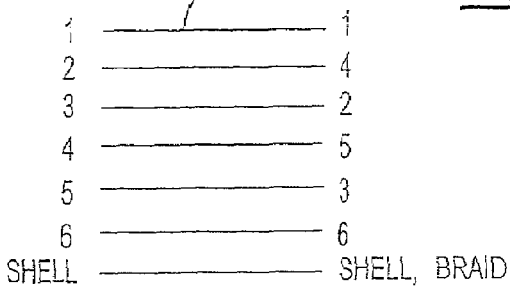
FIG. 8D is a pin-out diagram of the construction of FIG. 8A.
Figure 9D:
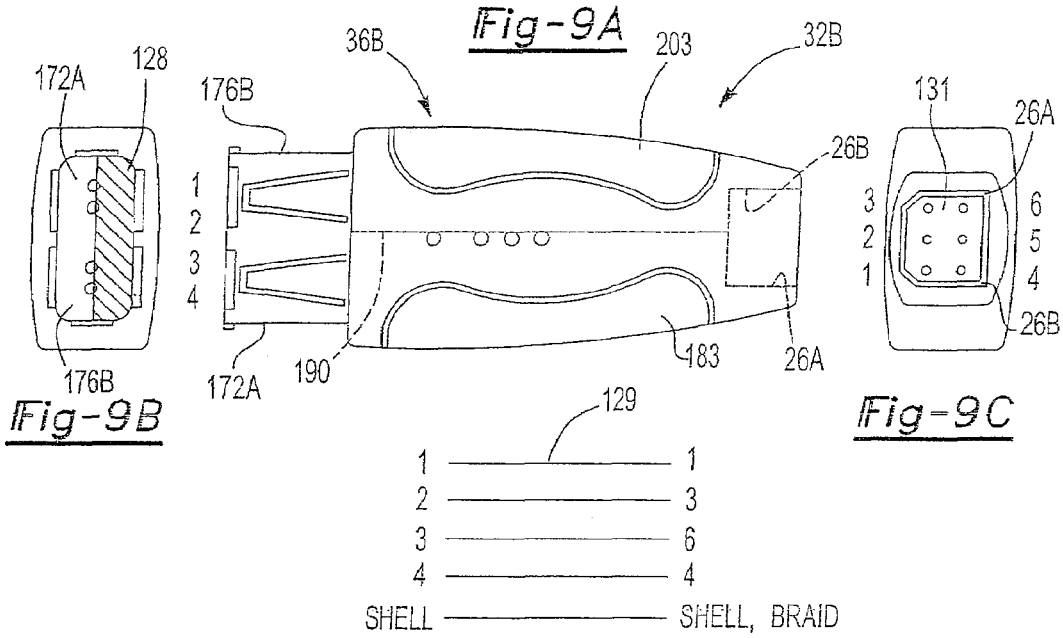
FIG. 9D is a pin-out diagram of the construction of FIG. 9A.
Figure 10D:
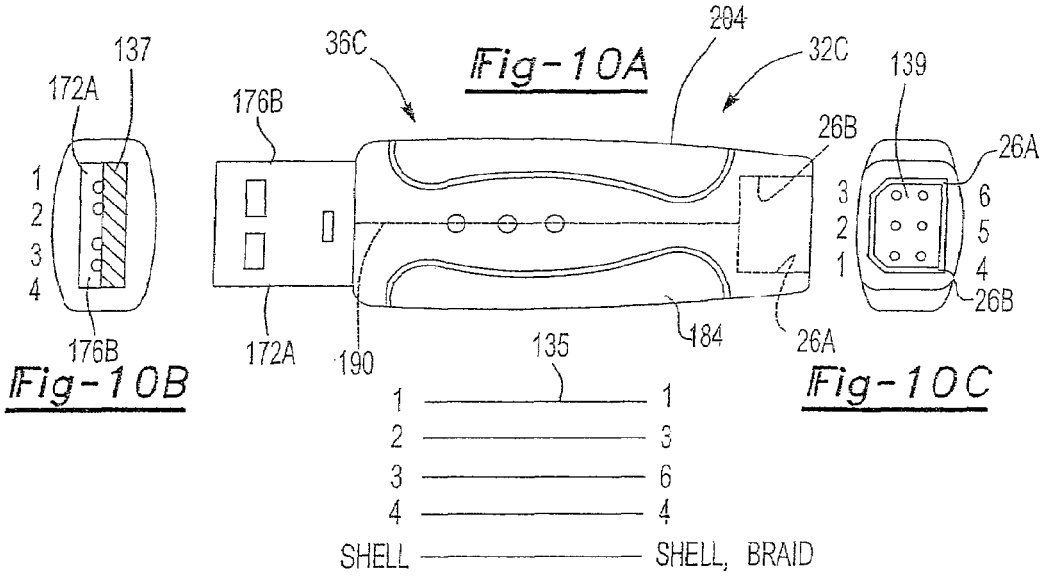
FIG. 10D is a pin-out diagram of the construction of FIG. 10A.

As shown in FIGS. 6A-C, the universal cable first connector portion 24A (as does the universal cable second mating connector portion 24B and the universal first system connector 42) comprises a six pin female connector 160 having a female connector body 161 having a universal connector shelf 178 that electrically and mechanically isolates the two sets of three female pins 163 that are mechanically attached to, or held in fixed relation to the connector body 161 by means well known in the art, such as molding. The female pins 163 have female cable connection points 167, which are the means for making electrical connections to the connector portions 24A, 24B (FIGS. 2), and 42 (FIG. 3).

Figure 5A:
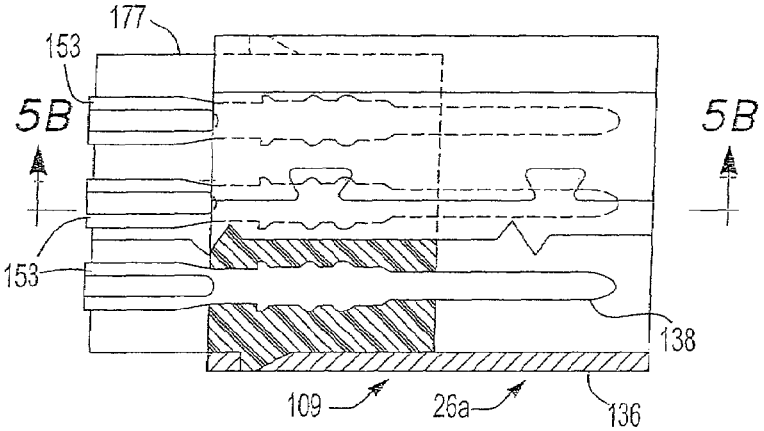
FIG. 5A is a top plan view, partially in section, of the male portion of the construction illustrated in FIG. 4.
Figure 5B:
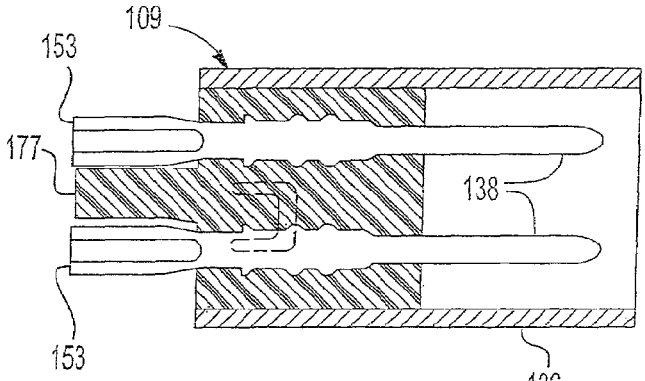
FIG. 5B is a sectional view, taken in the direction of the arrows, along the section line 5B-5B of FIG. 5A.
Figure 5C:
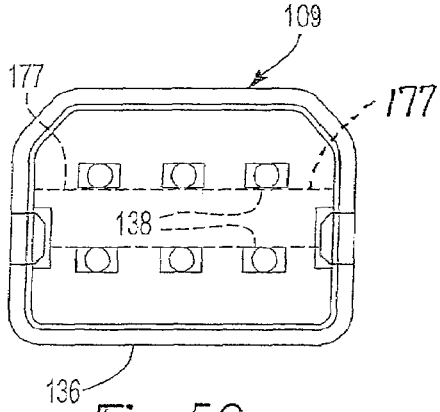
FIG. 5C is a right end view of the construction shown in FIG. 5B.

Illustrated in FIGS. 5A-C, is the universal cable quick connect first mating (male) connector portion 26A (this applies equally to 26B and 44) of the universal cable connector 25 in the form of a six pin male connector 109 of the present invention having six male pins 138 that are mechanically attached to, or held in place in relation to, the male connector body 136 by means well known in the art, and a connector shelf 177 that electrically and mechanically isolate each row of three male pins 138. Male cable connection points 153, which may be part of the male pins 138, aid in electrically attaching the male connector 109 to wires in a cable, for example, cable portion 22, or a converter, for example, miniature converter 32. The above-described structure applies equally as well to the universal cable quick connect second mating connector portion 26B and the connector 44.

Referring to FIGS. 7A-D, there is illustrated a first serial bus plug, Firewire® plug, receptacle, or converter 32, or second serial bus plug, Firewire® plug, receptacle or converter 36 in the form of a Firewire®—IEEE Standard 1394a-2000 4-Circuit Plug 201 (said standard being incorporated by reference herein in its entirety), having a first pin arrangement 114 and a second pin arrangement 116, which are mechanically and electrically connected per first pin-out diagram 115 and in electrical communication therewith.

The 4-Circuit Plug 201, when used as a first serial bus plug, Firewire® plug, receptacle or converter 32 comprises a miniature quick connect first housing 181, a third connector portion 172A, and a universal cable quick connect first mating connector portion 26A, wherein each of the connector portions 172A, 26A are in mechanical attachment with the housing 181 and in electrical attachment with the cabling 190, thus allowing electrical communications between the connector portions 172A, 26A.

Similarly, the 4-Circuit Plug 201, when used as a second serial bus plug, Firewire® plug, receptacle or converter 36 comprises miniature quick connect first housing 181, fifth connector portion 176B, and universal cable quick connect second mating connector portion 26B, wherein each of the connector portions 176B, 26B are in mechanical attachment with the housing 181 and in electrical attachment with the cabling 190, thus allowing electrical communications between the connector portions 176B, 26B.

Illustrated in FIGS. 8A-D, there is a first modified first serial bus plug, Firewire® plug, receptacle or converter 32A in the form of a Firewire®—IEEE Standard 1394-1995 (said standard being incorporated by reference herein in its entirety), 6-Circuit Plug 202 having a third pin arrangement 121 and a fourth pin arrangement 123 (substantially identical to first pin arrangement 116), which are mechanically and electrically connected per second pin-out diagram 125 and in electrical communication therewith.

The 6-Circuit plug 202, when used as a first modified first serial bus plug, Firewire® plug, receptacle or converter 32A comprises a miniature quick connect second housing 182, third connector portion 172A, and universal cable quick connect first mating connector portion 26A, wherein each of the connector portions 172A, 26A are in mechanical attachment with the second housing 182 and in electrical attachment with the cabling 190, thus allowing electrical communications between the connector portions 172A, 26A.

Similarly, the 6-Circuit plug 202, when used as the first modified second serial bus plug, Firewire® plug, receptacle or converter 36A comprises miniature quick connect second housing 182, fifth connector portion 176B, and universal cable quick connect second mating connector portion 26B, wherein each of the connector portions 176B, 26B are in mechanical attachment with the housing 182 and in electrical attachment with the cabling 190, thus allowing electrical communications between the connector portions 176B, 26B.

Illustrated in FIGS. 9A-D is a second modified first serial bus plug, Firewire® plug, receptacle, or converter 32B in the form of a 4 Pin USB Series "A" Receptacle 203, Rev. 2.0 (said standard being incorporated by reference herein in its entirety), having fifth pin arrangement 128 and a sixth pin arrangement 131 (substantially identical to second pin arrangement 116), which are mechanically and electrically connected per third pin-out diagram 129 and in electrical communication therewith.

The 4-pin USB Series "A" receptacle 203, when used as the second modified first serial bus plug, Firewire® plug, receptacle or converter 32B comprises miniature quick connect third housing 183, quick connect third mating connector portion 172A, quick connect first mating connector portion 26A, wherein each of the connector portions 172A, 26A are in mechanical attachment with the housing 183 and in electrical attachment with the cabling 190, thus allowing electrical communications between the connector portions 172A, 26A.

Similarly, the 4-Pin Series "A" receptacle 203, when used as the second modified second serial bus plug, Firewire® plug, receptacle or converter 36B comprises miniature quick connect third housing 183, fifth connector portion 176B, and quick connect second mating connector portion 26B, wherein each of the connector portions 176B, 26B are in mechanical attachment with the housing 183 and in electrical attachment with the cabling 190, thus allowing electrical communications between the connector portions 176B, 26B.

Illustrated in FIGS. 10A-D there is illustrated a third modified first serial bus plug, Firewire® plug, receptacle, or converter 32C in the form of a 4 Pin USB Series "A" Plug 204, Rev. 2.0 (said standard being incorporated by reference herein in its entirety), having a seventh pin arrangement 137 and an eighth pin arrangement 139 (substantially identical to second pin arrangement 116), which are mechanically and electrically connected per fourth pin-out diagram 135 and in electrical communication therewith.

The 4-Pin USB Series "A" plug 204, when used as the third modified first serial bus plug, Firewire® plug, receptacle or converter 32C comprises miniature quick connect fourth housing 184, third connector portion 172A, and universal cable quick connect first mating connector portion 26A, wherein each of the connector portions 172A, 26A are in mechanical attachment with the housing 184 and in electrical attachment with the cabling 190, thus allowing electrical communications between the connector portions 172A, 26A.

Similarly, the 4-Pin USB Series "A" plug 204, when used as the third modified second serial bus plug, Firewire® plug, receptacle or converter 36C comprises miniature quick connect fourth housing 184, fifth connector portion 176B, and universal cable quick connect second mating connector portion 26B, wherein each of the connector portions 176B, 26B are in mechanical attachment with the housing 184 and in electrical attachment with the cabling 190, thus allowing electrical communications between the connector portions 176B, 26B.

Illustrated in FIGS. 11A-D, is a fourth modified first serial bus plug, Firewire® plug, receptacle, or converter 32D in the form of a four pin USB Series "B" Plug 205, Rev. 2.0 (said standard being incorporated by reference herein in its entirety), having a ninth pin arrangement 143 and a tenth pin arrangement 146 (substantially identical to second pin arrangement 116), which are mechanically and electrically connected per fifth pin-out diagram 147 and in electrical communication therewith.

The 4-Pin USB -Series "B" plug 205, when used as the fourth modified first serial bus plug, Firewire® plug, receptacle or converter 32D comprises miniature quick connect fifth housing 185, third connector portion 172A, and universal cable quick connect first mating connector portion 26A, wherein each of the connector portions 172A, 26A are in mechanical attachment with the housing 185 and in electrical attachment with the cabling 190, thus allowing electrical communications between the connector portions 172A, 26A.

Similarly, the 4-Pin USB Series "B" plug 205, when used as the fourth modified second serial bus plug, Firewire® plug, receptacle or converter 36D comprises miniature quick connect fifth housing 185, fifth connector portion 176B, and universal cable quick connect second mating connector-portion 26B, wherein each of the connector portions 176B, 26B are in mechanical attachment with the housing 185 and in electrical attachment with the cabling 190, thus allowing electrical communications between the connector portions 176B, 26B.

Illustrated in FIGS. 12A-D, is a fifth modified first serial bus plug, Firewire® plug, receptacle, or converter 32E in the form of a five pin USB 2.0 Specification Mini-"A" Plug 206, Rev. 1.0 (said standard being incorporated by reference herein in its entirety), having an eleventh pin arrangement 152 and a twelfth pin arrangement 154 (substantially identical to second pin arrangement 116), which are mechanically and electrically connected per sixth pin-out diagram 151 and in electrical communication therewith.

The 5-Pin USB Mini-"A" plug 206 when used as the fifth modified first serial bus plug, Firewire® plug, receptacle or converter 32E comprises miniature quick connect sixth housing 186, third connector portion 172A, and universal cable quick connect first mating connector portion 26A, wherein each of the connector portions 172A, 26A are in mechanical attachment with the housing 186 and in electrical attachment with the cabling 190, thus allowing electrical communications between the connector portions 172A, 26A.

Similarly, the 5-Pin USB Mini "A" plug 206, when used as the fifth modified second serial bus plug, Firewire® plug, receptacle or converter 36E comprises miniature quick connect sixth housing 186, fifth connector portion 176B, and universal cable quick connect second mating connector portion 26B, wherein each of the connector portions 176B, 26B are in mechanical attachment with the housing 186 and in electrical attachment with the cabling 190, thus allowing electrical communications between the connector portions 176B, 26B.

Illustrated in FIGS. 13A-D, of the present invention, is a sixth modified first serial b/us plug, Firewire® plug, receptacle, or converter 32F in the form of a four pin USB 2.0 Specification Mini-"B" Plug 207, Rev. 1.0 (said standard being incorporated by reference herein in its entirety), having a thirteenth pin arrangement 158 and a fourteenth pin arrangement 162 (substantially identical to second pin arrangement 116), which are mechanically and electrically connected per seventh pin-out diagram 155 and in electrical communication therewith.

The 4-Pin USB-"Mini-B" plug 207, when used as the sixth modified first serial bus plug, Firewire® plug, receptacle or converter 32F, comprises miniature quick connect seventh housing 187, third connector portion 172A, and universal cable quick connect first mating connector portion 26A, wherein each of the connector portions 172A, 26A are in mechanical attachment with the housing 187 and in electrical attachment with the cabling 190, thus allowing electrical communications between the connector portions 172A, 26A.

Similarly, the 4-Pin USB "Mini-B" plug 207, when used as the sixth modified second serial bus plug, Firewire® plug, receptacle or converter 32F, comprises miniature quick connect seventh housing 187, fifth connector portion 176B, and universal cable quick connect second mating connector-portion 26B, wherein each of the connector portions 176B, 26B are in mechanical attachment with the housing 187 and in electrical attachment with the cabling 190, thus allowing electrical communications between the connector portions 176B, 26B.

Figure 14:
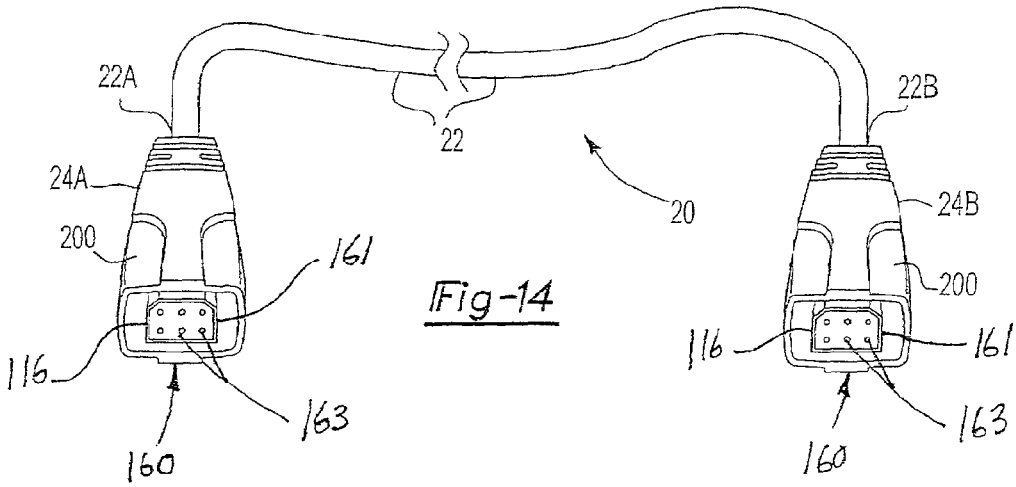
FIG. 14 is a partial perspective view of a construction embodying the present invention.

Referring to FIG. 14, since the second pin arrangement 116, the fourth pin arrangement 123, the sixth pin arrangement 131, the eighth pin arrangement 139, the tenth pin arrangement 146, the twelfth pin arrangement 154, the fourteenth pin arrangement 162 and an $n^{th}$ pin arrangement (not shown) are all substantially identical, a single universal cable 20 having a first universal cable connector portion 24A, and a second universal cable connector portion 24B can accept all necessary plugs, receptacles or converters (conventional connectors 32, 36) which are needed to connect computers, computer peripherals, computer related devices and other devices together.

First connector portion 24A and second connector portion 24B each have a connector housing 200, which preferably are identical. Mechanically attached to each connector housing 200 is a six pin-female connector 160, such as that illustrated in FIGS. 4 and 6. Since each six pin female connector 160 has a female connector body 161, connector shelf 178, and female connection points 167, the six pin female connector 160 easily connected to cable portion 22 of universal cable 20 by means well known in the art. Each six pin female connector 160 will be mechanically attached to connector housing 200, and electrically connected to cable portion 22.

A method of connecting computers to computer peripherals is provided utilizing a universal cable and a quick connect connector comprising the steps of: a) providing a universal computer cable (USB or Firewire®) 20 having a universal cable connector portion (female) (24A, 24B) electrically connected to an end of the universal computer cable; b) providing a universal cable miniature quick connect connector having a universal cable quick connect mating connector portion (26A, 26B); and c) connecting the universal cable connector to the quick connect connector by plugging the universal cable connector portion into the quick connect mating connector portion.

Also provided is a method of connecting external electrical equipment to computers and computer peripherals that comprises: a) providing a universal cable 20 having a universal cable first end 22A and second end 22B, wherein the universal cable first end has a universal cable first or female connector portion electrically connected thereto, which is in electrical communication with the universal cable second end 22B that is electrically connected to external electrical equipment; b) providing at least one quick connect serial bus plug or receptacle or converter 32 having a quick connect mating or male connector portion; and c) connecting the external electrical equipment to the at least one quick connect serial bus plug or receptacle or converter 32 by plugging the universal cable first connector portion 24A into the quick connect mating connector 26A.

Because the universal cable connector portions, and the quick connect mating connector portions may remain unchanged and accommodate a large number of first and/or second serial bus plugs, Firewire® plugs receptacles and/or converters, a truly universal cable system is provided.

Figure 15:
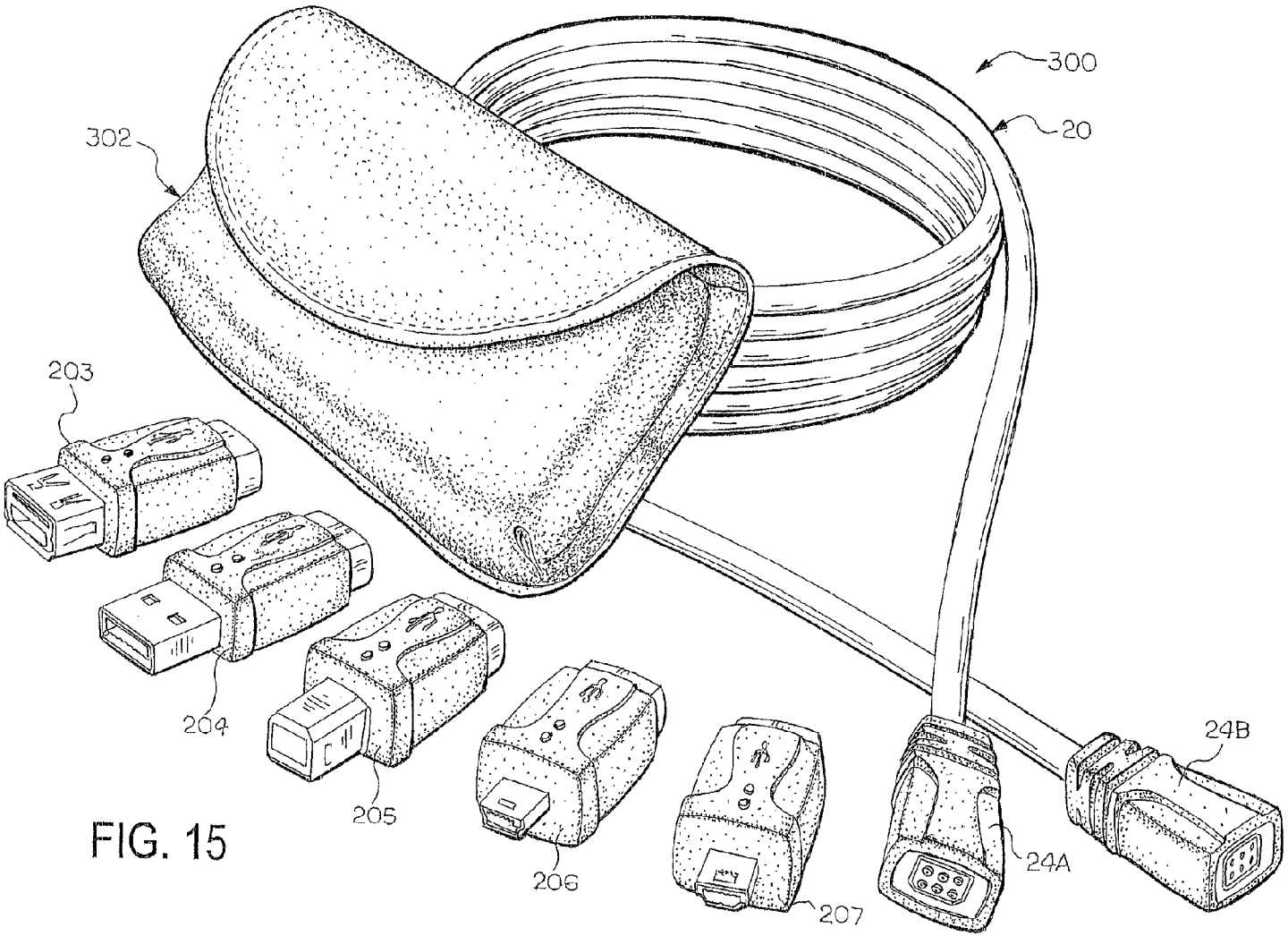
FIG. 15 is a perspective view of a universal computer cable kit in accordance with the present invention.

Referring now to FIG. 15, a universal computer cable kit in accordance with the present invention is indicated generally at 300. The kit 300 includes the universal cable 20 having the universal cable first connector portion 24A and the universal cable second connector portion 24B attached to opposing ends thereof, the 4-Pin USB Series "A" Receptacle 203, the 4 Pin USB Series "A" Plug 204, the 4-Pin USB Series "B" Plug 205, the 5-Pin USB 2.0 Specification Mini-"A" Plug 206, and the 4-Pin USB 2.0 Specification Mini-"B" Plug 207, collectively referred to as interchangeable plugs or connectors. The kit 300 also includes a container 302 that is sized to contain all of the connectors 203 through 207. The interchangeable connectors 203 through 207 are each operable to be interchangeably and releasably connected to either the universal cable first connector portion 24A and the universal cable second connector portion 24B.

The interchangeability of the connectors 203 through 207 of the kit 300 advantageously allows the universal cable 20 to be configured in a plurality of configurations, depending on the needs of the user of the universal cable 20. In a first configuration of the kit 300, the 4-Pin USB Series "A" plug 204 is attached to a one of the universal cable first connector portion 24A and the universal cable second connector portion 24B and the 4-Pin USB Series "B" plug 205 is attached to the other of the universal cable first connector portions, as outlined in more detail above. In the first configuration of the kit 300, the universal cable 20 is advantageously operable to connect a computer or hub (not shown) to a printer (not shown), a scanner (not shown), or a CD/DVD drive (not shown), such as by connecting the Pin USB Series "A" plug 204 to the computer or hub and connecting the 4-Pin USB Series "B" plug 205 to the printer, the scanner or the CD/DVD drive.

In a second configuration of the kit 300, the 4-Pin Series "A" receptacle 203 is attached to a one of the universal cable first connector portion 24A and the universal cable second connector portion 24B and the 4-Pin USB Series "A" plug 204 is attached to the other of the universal cable first connectors, as outlined in more detail above. In the second configuration of the kit 300, the universal cable 20 is advantageously operable to provide a USB extension cable.

In a third configuration of the kit 300, the 4-Pin USB Series "A" plug 204 is attached to a one of the universal cable first connector portion 24A and the universal cable second connector portion 24B and the 4-Pin USB-"Mini-B" plug 207 is attached to the other of the universal cable first connectors, as outlined in more detail above. In the third configuration of the kit 300, the universal cable 20 is advantageously operable to connect the computer or hub to a PDA (not shown), a digital camera (not shown), or a MP3 player (not shown), such as by connecting the 4-Pin USB Series "A" plug 204 to the computer or hub and connecting the 4-Pin USB-"Mini-B" plug 207 to the PDA, the digital camera or the MP3 player.

In a fourth configuration of the kit 300, the 5-Pin USB Mini "A" plug 206 is attached to a one of the universal cable first connector portion 24A and the universal cable second connector portion 24B and the 4-Pin USB-"Mini-B" plug 207 is attached to the other of the universal cable first connectors, as outlined in more detail above. In the fourth configuration of the kit 300, the universal cable 20 is advantageously operable to connect the PDA to a cell phone (not shown), to connect the cell phone to the digital camera and to connect the MP3 player to another MP3 player, such as by connecting the 5-Pin USB Mini "A" plug 206 to the PDA, the cell phone, or the MP3 player and connecting the 4-Pin USB-"Mini-B" plug 207 to the cell phone, the digital camera, or the other MP3 player.

In a fifth configuration of the kit 300, the 5-Pin USB Mini "A" plug 206 is attached to a one of the universal cable first connector portion 24A and the universal cable second connector portion 24B and the 4-Pin USB Series "B" plug 205 is attached to the other of the universal cable first connector portions, as outlined in more detail above. In the fifth configuration, the universal cable 20 is advantageously operable to connect the PDA to the printer or to a hard drive (not shown), or to connect the digital camera to the printer, such as by connecting the 5-Pin USB Mini "A" plug 206 to the PDA or the digital camera and connecting the 4-Pin USB Series "B" plug 205 to the printer or the hard drive.

When the kit 300 is configured in any of the configurations detailed above, the container 302 securely stores those of the 4-Pin USB Series "A" Receptacle 203, the 4 Pin USB Series "A" Plug 204, the 4-Pin USB Series "B" Plug 205, the 5-Pin USB 2.0 Specification Mini-"A" Plug 206, and the 4-Pin USB 2.0 Specification Mini-"B" Plug 207 that are not used in the current configuration.

Figure 16:
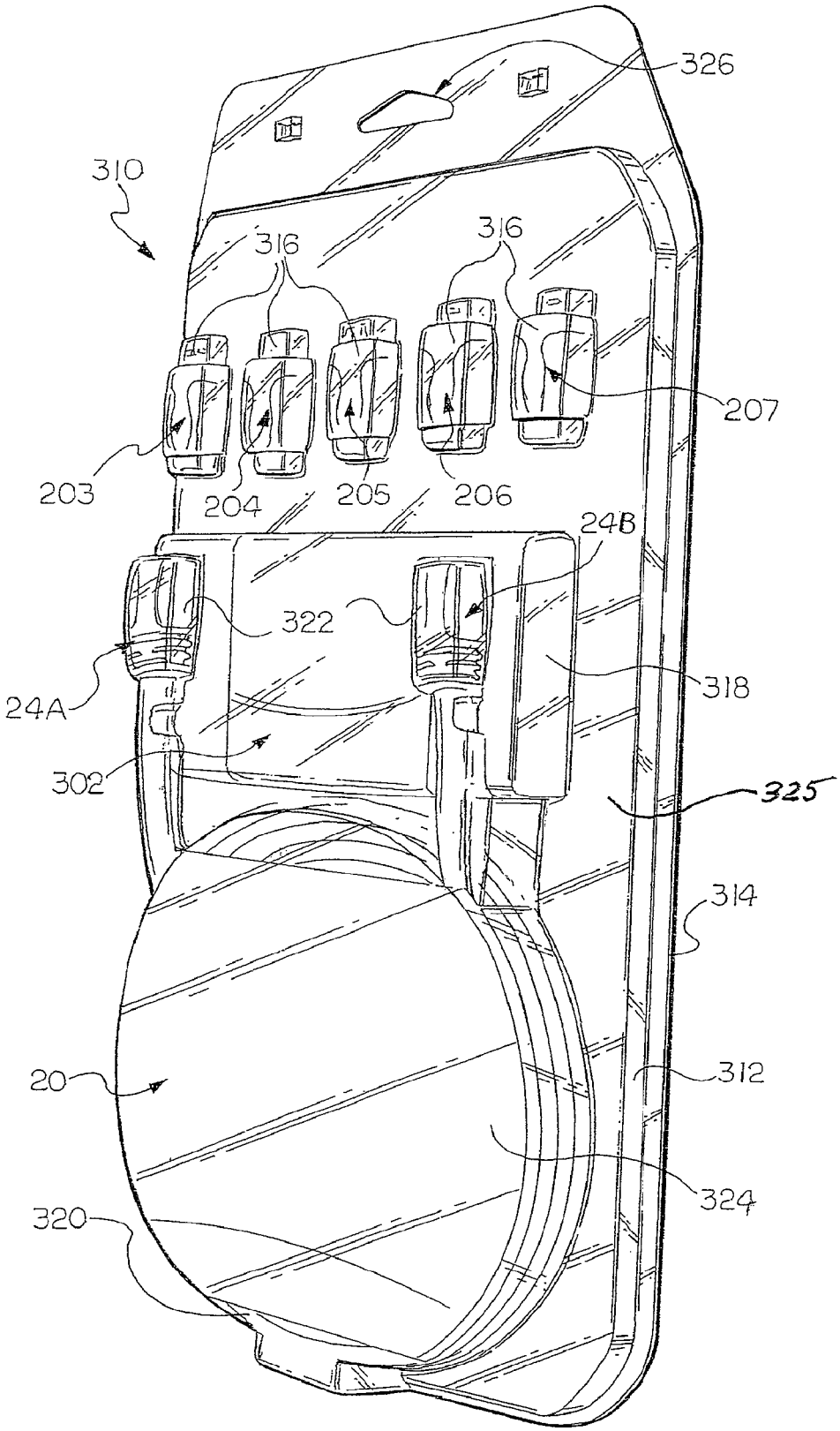
FIG. 16 is a perspective view of the universal computer cable kit of FIG. 15 shown in a blister pack.

Referring now to FIG. 16, the kit 300 is shown encased in a blister pack 310 used for packaging and displaying the kit 300. The blister pack 310 includes a first side wall 312 and a second side wall 314 attached together for enclosing the kit 300 therein and forming a display. The first side 312 is formed of a transparent material and includes a plurality of smaller, generally rectangular protuberances 316 extending therefrom near an upper end, each of which defines a corresponding recess for one of the interchangeable connectors 203 through 207. An intermediate size, generally rectangular protuberance 318 is formed in the first side 312 to define a recess for the container 302. A larger, generally circular protuberance 320 is formed at a lower end of the first side 312 to define a recess for the coiled universal cable 20. A pair of smaller, generally rectangular protuberances 322 is formed on the protuberance 320 to define corresponding recesses for the universal cable first connector portion 24A and the universal cable second connector portion 24B. The blister pack 310 may also enclose a first insert 324, formed of a cardboard or the like material, shaped to fit into the protuberance 320 in front of the cable 20 for displaying information and/or images. A second insert 325, formed of a cardboard or the like material, is shaped to fit between the first wall 312 and the second wall 314 for displaying information and/or images. The second wall 314 can be formed of a transparent material. An aperture 326 is formed in an upper portion of the blister pack 310 and extends through the walls 312, 314 for use in hanging the blister pack 300 for display.

Figure 17:
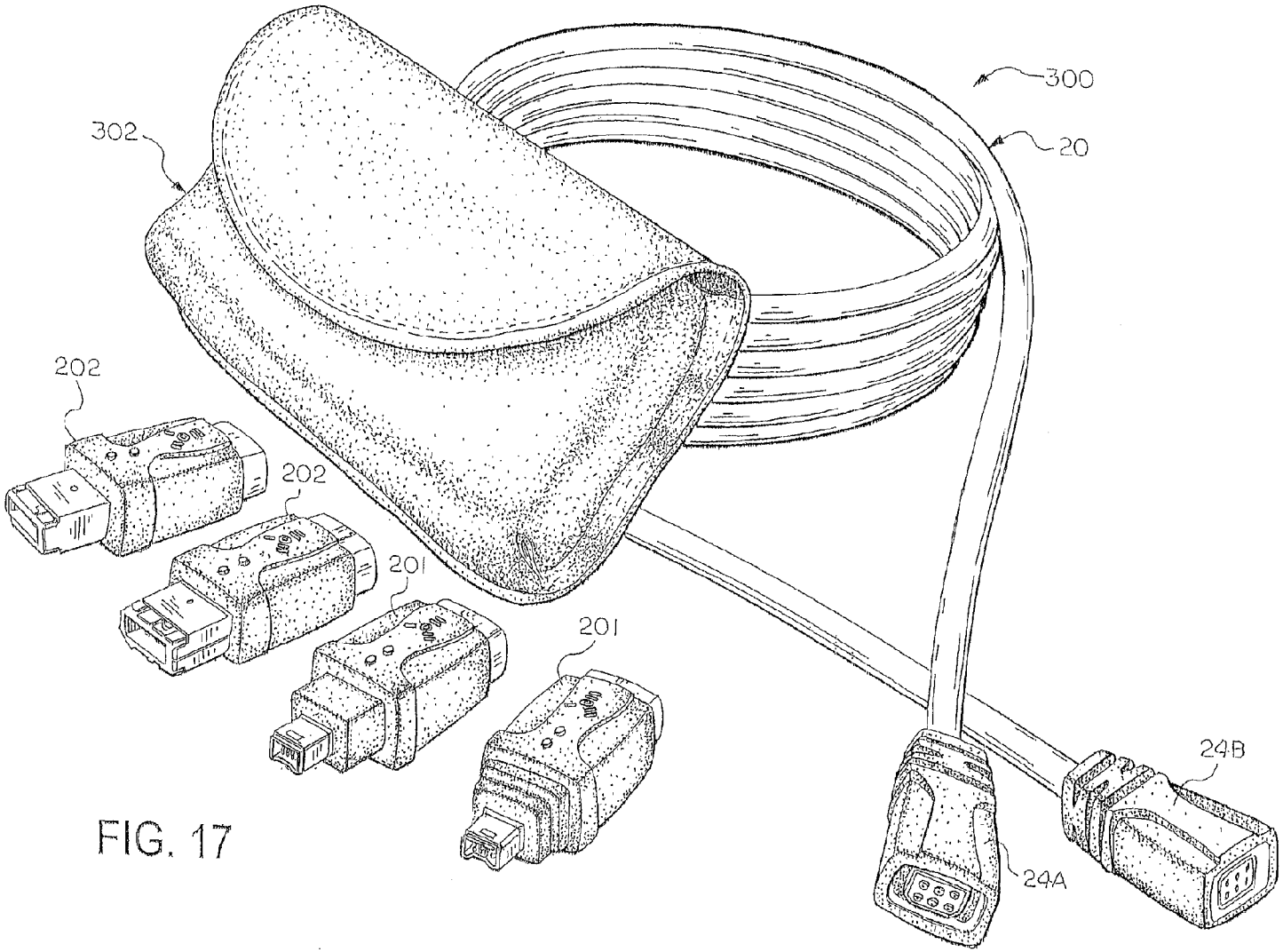
FIG. 17 is a perspective view of an alternative embodiment of a universal computer cable kit in accordance with the present invention.

Referring now to FIG. 17, an alternative embodiment of a kit in accordance with the present invention is indicated generally at 300'. The kit 300' includes the universal cable 20 having the universal cable first connector portion 24A and the universal cable second connector portion 24B, a pair of the Firewire®—IEEE Standard 1394a-2000 201 4-Circuit Plugs 201 and a pair of the Firewire®—IEEE Standard 1394-1995 6-Circuit Plugs 202, the plugs collectively referred to as interchangeable connectors. The kit 300' also includes the container 302 that is sized to store all of the plugs 201, 202. The interchangeable connectors 201, 202 are each operable to be interchangeably and releasably connected to the universal cable first connector portion 24A and the universal cable second connector portion 24B.

The interchangeability of the connectors 201, 202 of the kit 300' advantageously allows the universal cable 20 to be configured in a plurality of configurations, depending on the needs of the user of the universal cable 20. In a first configuration of the kit 300', a one of the 4-Circuit Plugs 201 is attached to a one of the universal cable first connector portion 24A and the universal cable second connector portion 24B and a one of the 6-Circuit Plugs 202 is attached to the other universal cable first connector portion, as outlined in more detail above. In the first configuration of the kit 300', the universal cable 20 is advantageously able to connect the computer or the hub to a digital video camera (not shown) or to audio mixing equipment (not shown), such as by connecting the 4-Circuit Plug 201 to the computer or the hub and connecting the 6-Circuit Plug 202 to the digital video camera or to the audio mixing equipment.

In a second configuration of the kit 300', a one of the 4-Circuit Plugs 201 is attached to a one of the universal cable first connector portion 24A and the universal cable second connector portion 24B and the other 4-Circuit Plug 201 is attached to the other of the universal cable first connector portions, as outlined in more detail above. In the second configuration of the kit 300', the universal cable 20 is advantageously able to connect the digital video camera to another digital video camera or the audio mixing equipment, and to connect the audio mixing equipment to the digital video camera or to another audio mixing equipment, such as by connecting one of the 4-Circuit plugs 201 to the digital video camera or the audio mixing equipment and connecting the other 4-Circuit plug 201 to the other digital video camera or the other audio mixing equipment.

In a third configuration of the kit 300', a one of the 6-Circuit Plugs 202 is attached to a one of the universal cable first connector portion 24A and the universal cable second connector portion 24B and the other 6-Circuit Plug 202 is attached to the other of the universal cable first connector portions, as outlined in more detail above. In the third configuration of the kit 300', the universal cable 20 is advantageously able to connect the computer or hub to another computer or hub, to the scanner, to the CD/DVD drive or to the hard drive, such as by connecting one of the 6-Circuit Plugs 202 to the computer or hub and connecting the other 6-Circuit Plug 202 to the other computer or hub, to the scanner, to the CD/DVD drive or to the hard drive.

When the kit 300' is configured in any of the configurations detailed above, the container 302 securely store those of the 4-Circuit Plugs 201 and the 6-Circuit Plugs 202 that are not used in the current configuration.

Those skilled in the art will appreciate that various combinations of the interchangeable ends 201 through 207 may be provided and that more or fewer of the interchangeable ends 201 through 207 including, but not limited to, Firewire® plugs, receptacles, and/or converters may be provided with the universal cable 20 and/or the container 302 to form a kit, such as the kit 300 or 300', while remaining within the scope of the present invention.

Figure 18:
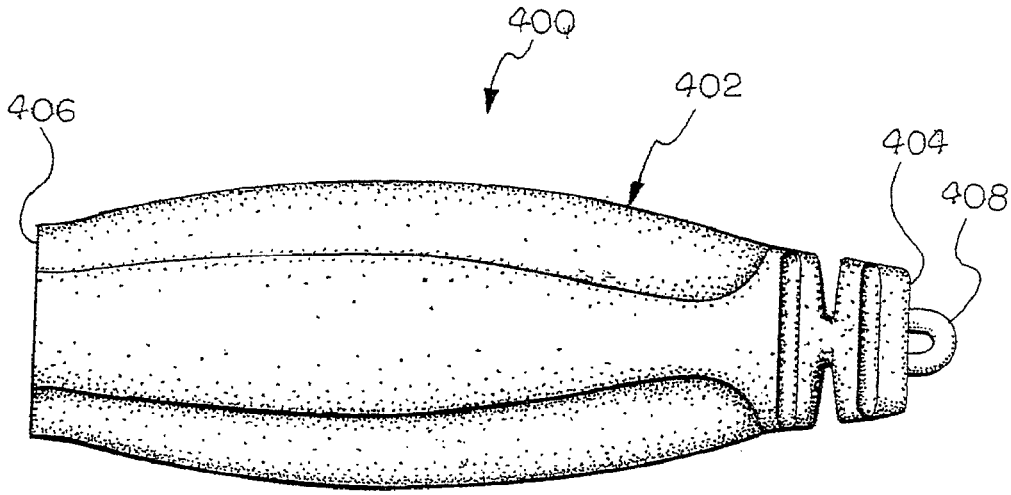
FIG. 18 is a top plan view of a flash memory storage device with quick connector in accordance with the present invention.
Figure 19:
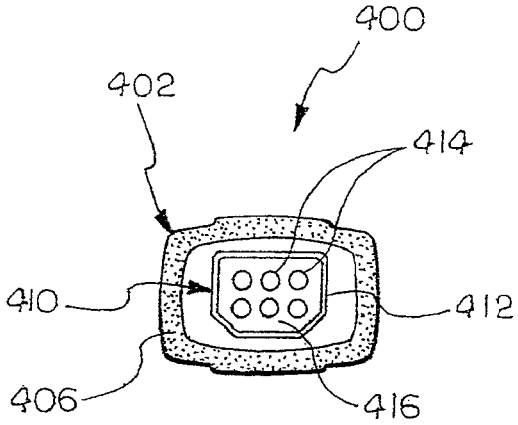
FIG. 19 is a front elevation view of the flash memory device of FIG. 18.
Figure 20:
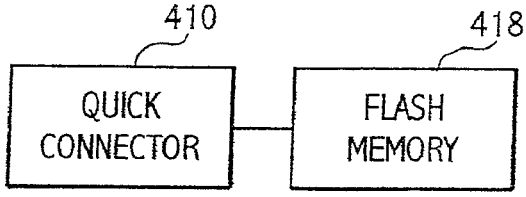
FIG. 20 is a schematic block diagram of the flash memory device and quick connector of FIGS. 18 and 19.

Referring now to FIGS. 18 and 19, a flash memory storage device with a quick connector in accordance with the present invention is indicated generally at 400. The flash memory device 400 includes a housing 402 having a first end 404 and an opposed second end 406. The first end 404 includes a loop portion 408 extending therefrom for attaching the flash memory drive 400 to a key chain, a lanyard, or the like. Preferably, a flash memory drive 418 (FIG. 20) is selected from various commercially available flash drives well known to those skilled in the art including, but not limited to, those manufactured and/or sold by Sony®, SanDisk®, Iomega®, Lexar®, Verbatim®, Targus®, and the like. The total amount of available flash memory storage capacity may be, but is not limited to, 64 megabytes (MB) of data storage, 128 MB, 256 MB, 512 MB, 1 gigabyte (GB) or other amounts of memory. Those skilled in the art, however, will appreciate that the amount of memory storage may be chosen for a specification application or desired use while remaining within the scope of the present invention.

The second end 406 of the housing 402 includes a six pin female quick connector or receptacle 410, best seen in FIG. 19, that includes a female connector body 412 having two sets of three female pins 414 that are electrically and mechanically isolated by a universal connector shelf (not shown), such as the universal connector shelf 178 shown in FIG. 6C. The two sets of three female pins 414 are mechanically attached to, or held in fixed relation to the connector body 412 by means well known in the art, such as molding. The female pins 414 are arranged in a pin arrangement 416, substantially identical to the pin arrangement 116, and have female cable connection points (not shown), such as the female cable connection points 167 shown in FIGS. 6A and 6B, which are the means for making electrical connections to the connector portions 24A, 24B (FIGS. 2), and 42 (FIG. 3), discussed in more detail below.

Since the pin arrangement 416 is substantially identical to the second pin arrangement 116, the fourth pin arrangement 123, the sixth pin arrangement 131, the eighth pin arrangement 139, the tenth pin arrangement 146, the twelfth pin arrangement 154, the fourteenth pin arrangement 162 and the $n_{th}$ pin arrangement (not shown), the connector 410 of the second end 406 of the flash memory device 400 is operable to connect to a one of the respective quick connect first mating connector portions 26A and quick connect second mating connector portions 26B of the 4-Pin USB Series "A" Receptacle 203, the 4 Pin USB Series "A" Plug 204, the 4-Pin USB Series "B" Plug 205, the 5-Pin USB 2.0 Specification Mini-"A" Plug 206, and the 4-Pin USB 2.0 Specification Mini-"B" Plug 207, collectively referred to as interchangeable connectors. The interchangeable connectors 203, 205, 205, 206 and 207, therefore, are each operable to be interchangeably and releasably connected to the connector 410 to electrically communicate with the flash memory 418 in the housing 402.

The flash memory device 400 may be combined with the kit 300 to form an alternative embodiment of the kit. The container 302 of the kit 300 shown in FIGS. 15 and 17 can be sized to contain all of the connectors 203, 204, 205, 206 and 207 and the flash memory device 400 and the universal cable 20, if desired. The flash memory device 400 may be encased in the blister pack 310 by providing an additional protuberance, such as the protuberances 316 and 322 shown in FIG. 16, suitably sized and shaped.

The interchangeability of the ends 203, 204, 205, 206 and 207 advantageously allows the flash memory device 400 to be configured in a plurality of conventional connector configurations, depending on the needs of the user. For example, when the 4-Pin USB Series "A" plug 204 is attached to the connector 410 of the flash memory device 400, the flash memory drive 418 is advantageously operable to connect to a computer or a hub (not shown) having the corresponding conventional USB port. When connector 204 with the flash memory device 400 is engaged with the USB port (not shown) in the computer, the operating system of the computer will recognize the flash memory drive 418 as a removable drive and allow data to be retrieved from and written to the flash memory storage.

Similarly, when the 4-Pin USB Series "B" plug 205 is attached to the connector 410 of the flash memory device 400, the flash memory drive 418 is advantageously operable to connect to a printer (not shown), a scanner (not shown) or a CD/DVD drive (not shown). Similarly, when the 5-Pin USB Mini "A" plug 206 is attached to the connector 410 of the flash memory device 400, the flash memory drive 418 is advantageously operable to connect to a PDA (not shown), a cell phone (not shown), or a MP3 player (not shown). Similarly, when the 4-Pin USB-"Mini-B" plug 207 is attached to the connector 410 of the flash memory device 400, the flash memory drive 418 is advantageously operable to connect to the PDA, a digital camera (not shown) or the MP3 player.

Since the pin arrangement 416 is substantially identical to the second pin arrangement 116, the fourth pin arrangement 123, the sixth pin arrangement 131, the eighth pin arrangement 139, the tenth pin arrangement 146, the twelfth pin arrangement 154, the fourteenth pin arrangement 162 and the $n^{th}$ pin arrangement (not shown), the connector 410 of the second end 406 of the flash memory device 400 is also operable to connect to a one of the respective quick connect first mating connector portions 26A and quick connect second mating connector portions 26B of the Firewire®—IEEE Standard 1394a-2000 4-Circuit Plug 201 and the Firewire®—IEEE Standard 1394-1995 6-Circuit Plug 202, the plugs 201 and 202 collectively referred to as interchangeable plugs or connectors. The interchangeable connectors 201 and 202, therefore, are each operable to be interchangeably and releasably connect to the connector 410 of the flash memory device 400. The interchangeability of the connectors 201 and 202 advantageously allows the flash memory device 400 to be configured for connection to a number of devices as described above depending on the needs of the user.

Those skilled in the art will appreciate that various combinations of the interchangeable connectors 201, 202, 203, 204, 205, 206, and 207 may be provided and that more or fewer of the interchangeable connectors may be provided with the universal cable 20 and the flash memory device 400 to form alternative embodiments of the kit while remaining within the scope of the present invention.

Figure 21:
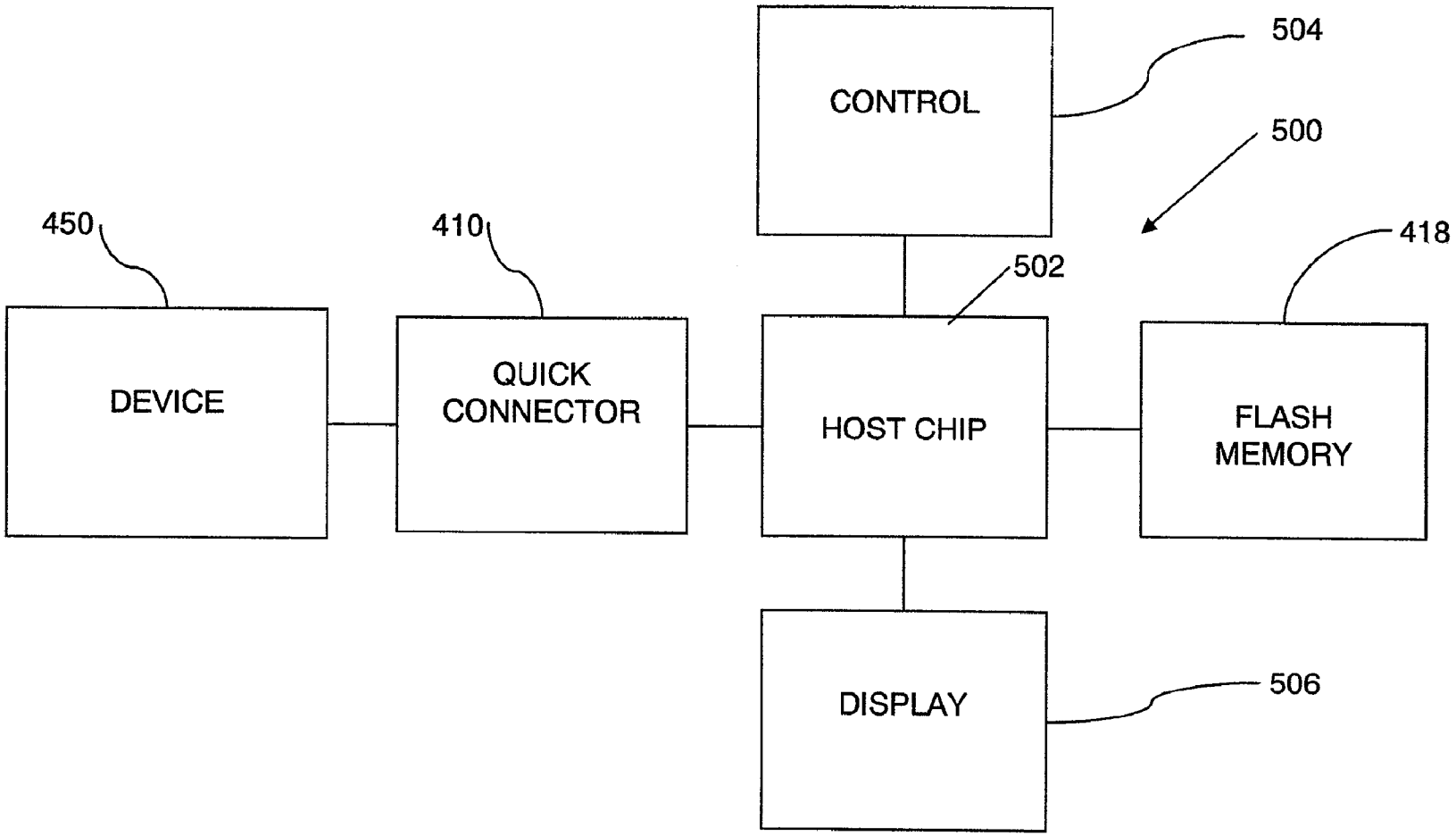
FIG. 21 is a schematic block diagram of the flash memory device and quick connector of FIG. 20 including means for selective file transfer.

The device 50, shown in FIG. 3, can be a flash memory device 500, shown in FIG. 21, for selectively transferring individual files between the flash memory 418 and a device 450 having a memory. For example, the device 450 can be a computer, a cell phone, a PDA, a printer, another flash drive, a peripheral disk drive and the like. The quick connector 410 connects the flash memory device 500 with a conventional connector provided on the device 450. The flash memory device 500 includes a host chip 502 for controlling the transfer of data between the memory of the device 450 and the flash memory 418. A control 504 and a display 506 are connected to the host chip 502.

The control 502 provides at least two functions. The first function is to select the direction of transfer of the data. If the device 450 has the capacity to act as a host, the control 502 can be used to select a slave mode of operation of the host chip 502. Thus, the device 450, such as a computer, will recognize the flash memory device as a storage peripheral and control the reading of data from and the writing of data to the flash memory 418.

The second function of the control 504 is to select individual files to be transferred when the host chip 502 is in the host mode of operation. The control 504 will cause the host chip 502 to read the names of individual files stored in the memory of the device 450 and the flash memory 418. The host chip 502 will signal the display 506 to visually indicate an identification of the selected file (e.g., the file name) so that the user can make a decision on whether or not to copy, move or delete the file using the control 504.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A flash memory device comprising:

a housing having opposed first and second ends;

a flash memory drive enclosed in said housing;

a host chip connected to said flash memory drive [for selectively operating said flash memory drive in a host mode and a slave mode]; and a quick connector mounted in said housing and being connected to said host chip, said quick connector having a plurality of pins exposed at said second end, said pins being configured for electrical connection to a selected one of at least a first interchangeable connector and a second interchangeable connector, the first interchangeable connector having a first pin configuration for mating with said pins of said quick connector and being connected to a second pin configuration different from the first pin configuration, the second interchangeable connector having the first pin configuration for mating with said pins of said quick connector and being connected to a third pin configuration different from the first pin configuration and the second pin configuration, the second and third pin configurations being pin configurations of different types of conventional connectors.

2. The flash memory device according to claim 1 wherein said housing includes a loop portion extending from said first end.

3. The flash memory device according to claim 1 including a control connected to said host chip for manually selecting [said] *a* host mode and [said] *a* slave mode.

4. The flash memory device according to claim 1 wherein said plurality of pins is six female pins arranged in two parallel rows of three pins each.

5. The flash memory device according to claim 4 including a female connector body extending about said pins.

6. The flash memory device according to claim 1 including a control connected to said host chip for selecting individual files stored in said flash memory drive.

7. The flash memory device according to claim 6 including a display connected to said host chip for visually displaying an identification of the selected individual files.

8. A universal computer cable kit, comprising:

a flash memory device including a flash memory drive connected to a female quick connector by a host chip;

a cable portion having a first end, a second end electrically connected to said first end, and a female quick connector attached to each of said first and second ends;

at least three interchangeable connectors each having a male quick connector electrically connected to a different type of conventional connector and each said male quick connector being adapted to engage said female quick connectors of said flash memory device and said cable portion; and a container for storing said interchangeable connectors and said flash memory device when not in use.

9. The kit according to claim 8 wherein said flash memory device has a housing with a loop portion extending from one end thereof.

10. The kit according to claim 8 wherein each of said female quick connectors has six female pins arranged in two parallel rows of three pins each.

11. The kit according to claim 10 wherein each of said female quick connectors includes a female connector body extending about said pins.

12. The kit according to claim 8 including a blister pack enclosing said flash memory device, said universal cable, said interchangeable connectors and said container.

13. The kit according to claim 12 wherein said blister pack has a transparent wall having a plurality of protuberances formed therein receiving said flash memory device, said universal cable, said interchangeable connectors and said container.

14. A flash memory kit comprising:

a flash memory device including a flash memory drive connected to a female quick connector by a host chip; and at least two interchangeable connectors each having a male quick connector with a first pin configuration adapted to engage said female quick connector, a first one of said interchangeable connectors having said male quick connector connected to a second pin configuration different from said first pin configuration and a second one of said interchangeable connectors having said male quick connector connected to a third pin configuration different from said first pin configuration and said second pin configuration, said second and third pin configurations being pin configurations of different types of conventional connectors.

15. The flash memory kit according to claim 14 including a container for storing said interchangeable connectors and said flash memory device when not in use.

16. The flash memory device according to claim 14 including a control connected to said host chip for manually selecting a host mode of operation and a slave mode of operation.

17. The flash memory device according to claim 14 including a control connected to said host chip for selecting individual files stored in said flash memory drive.

18. The flash memory device according to claim 17 including a display connected to said host chip for visually displaying an identification of the selected individual files.

19. The flash memory device according to claim 14 wherein said flash memory device further comprises a housing having opposed first and second ends, said housing enclosing said flash memory drive and said female quick connector is mounted in said housing.

20. The flash memory device according to claim 19 wherein said housing includes a loop portion extending from said first end.

21. The flash memory device according to claim 19 wherein said quick connector has a plurality of pins exposed at said second end of said housing.

22. The flash memory device according to claim 21 wherein said plurality of pins is six female pins arranged in two parallel rows of three pins each.

23. The flash memory device according to claim 22 including a female connector body extending about said pins.

24. A memory device comprising:

a housing having opposed first and second ends;

a memory drive enclosed in said housing;

a host chip operatively connected to said memory drive [for selectively operating said memory drive in a host mode and a slave mode]; and a quick connector mounted in said housing and being operatively connected to said host chip, said quick connector having a pin receptor exposed at said second end, said pin receptor being configured for electrical connection to a selected one of at least a first interchangeable connector and a second interchangeable connector, the first interchangeable connector having a first pin configuration for mating with said pin receptor of said quick connector and being connected to a second pin configuration different from the first pin configuration, the second interchangeable connector having the first pin configuration for mating with said pin receptor of said quick connector and being connected to a third pin configuration different from the first pin configuration and the second pin configuration, the second and third pin configurations being pin configurations of different types of conventional connectors.

25. A memory device comprising:

a housing having opposed first and second ends;

a memory drive enclosed in said housing;

a host chip operatively connected to said memory drive for selectively operating said memory drive in a host mode and a slave mode; and a quick connector mounted in said housing and being operatively connected to said host chip, said quick connector having an electrical interface exposed at said second end, said electrical interface being configured for electrical connection to a selected one of at least a first interchangeable connector and a second interchangeable connector, the first interchangeable connector having a first electrical interface for mating with said electrical interface of said quick connector and being connected to a second electrical interface different from the first electrical interface, the second interchangeable connector having the first electrical interface for mating with said electrical interface of said quick connector and being connected to a third electrical interface different from the first electrical interface and the second electrical interface, the second and third electrical interfaces being electrical interfaces of different types of conventional connectors.

* * * * *